United States Patent Office 3,074,985
Patented Jan. 22, 1963

3,074,985
PREPARATION OF TRIALKYL VINYL
TIN COMPOUNDS
Edwin M. Smolin, Springdale, and Michael N. O'Connor, South Norwalk, Conn., assignors to American Cyanamid Company, New York, N.Y., a corporation of Maine
No Drawing. Filed Jan. 31, 1961, Ser. No. 85,988
4 Claims. (Cl. 260—429.7)

This invention relates to a new process for preparing trialkylvinyl tin compounds. More specifically, this invention relates to the preparation of trialkylvinyl tin compounds by reacting trialkyl tin hydrides with acetylene, alone, or in the presence of a free-radical-generating catalyst. Still more particularly, this invention relates to a process for the preparation of a trialkylvinyl tin compound by reacting a trialkyl tin hydride with acetylene, alone, or in the presence of a free-radical-generating catalyst and a solvent for the trialkyl tin hydride, at a temperature of from about 20° C. to about 150° C.

The processes known in the prior art for the preparation of trialkylvinyl tin compounds have been characterized by various substantial disadvantages such as very complicated reactions, high cost of starting materials and various commercial difficulties, such as sensitivity to moisture, use of highly flammable materials such as ether, etc. The present invention provides a method for the preparation of trialkylvinyl tin compounds by an inexpensive, simple and industrially feasible method.

The object of the present invention is to provide a new and improved process for the production of trialkylvinyl tin compounds which will be free of the disadvantages mentioned above. This and other objects of the present invention will be obvious from the more detailed discussion presented hereinbelow.

The present invention is a process for the production of trialkylvinyl tin compounds which comprises reacting acetylene with various trialkyl tin hydrides wherein the alkyl group contains from 1 to 6 carbon atoms. Isomers of these trialkyl tin hydrides and mixtures thereof may also be utilized. The reaction is carried out at a temperature of from about 20° C. to about 150° C. and a partial pressure of acetylene of about 15 p.s.i.g. to about 400 p.s.i.g. alone, or preferably in the presence of a free-radical-generating catalyst or initiator.

The process is preferably carried out by adding the trialkyl tin hydride, a solvent therefor, and the catalyst into a suitable reaction vessel. The three above mentioned ingredients can be added all at once or any one of the materials can be added first, the others being added individually thereafter. In other words, there is no critical sequence for the addition of the starting materials.

It is preferred that the reaction be carried out in the presence of a solvent for the trialkyl tin hydride but it is not essential that this be the case and the solvent can be eliminated, if desired. The vessel is evacuated, purged and heated to the desired temperature. Acetylene is added until the desired pressure has been reached. The vessel is rocked and more acetylene is added to replenish that which reacts. The reaction is essentially complete when no further drop in pressure is observed.

The vessel is then cooled and vented to relieve the pressure. The reaction mixture is isolated and distilled at atmospheric pressure, preferably in the presence of a polymerization inhibitor, thereby removing the solvent. The trialkylvinyl tin compound is then conveniently collected by distillation under reduced pressure.

Among the prior art processes for the production of trialkyl-vinyl tin compounds which have been set forth in various publications are the following:

(A) Rosenberg et al., J. Am Chem. Soc. vol. 79, pages 2137 and 2138, May 1957, disclose preparing tri-n-butylvinyltin at a yield of 82% by reacting vinylmagnesium chloride in tetrahydrofuran solution with the appropriate tin halide in a hydrocarbon solvent. The product is recovered by vacuum distillation.

(B) Rosenberg et al. in the same article also disclose preparing tri-n-butylvinyl tin in a yield of 85% by reacting bistri-n-butyl tin oxide and vinylmagnesium chloride.

(C) Seyferth et al., J. Am. Chem. Soc., vol. 79, pages 515 to 517 teach preparing vinyl tin compounds of the type $(vinyl)_nSn(alkyl)_{4-n}$ ($n=1$–3) by treating organotin halides with excess vinyl magnesium bromide using relatively basic ethers as a solvent.

All of the above methods employ a Grignard reagent which must be separately prepared, thus necessitating a multiplicity of steps in the synthesis.

All of the above preparative methods offer limited commercial attraction because of the disadvantages mentioned above. The instant invention obviates these disadvantages and presents an attractive commercial method for the preparation of trialkylvinyl tin compounds.

The following examples are by way of illustration only and are by no means meant to be construed as limitations on the instant invention. All parts and percentages are by weight unless otherwise indicated.

*Example 1*

To 22 parts of tri-n-butyl tin hydride in a suitable pressure vessel are added 44 parts of benzene and 0.6 part of azobisisobutyronitrile. The vessel is evacuated, purged with nitrogen three times and heated to 80–85° C. for 30 minutes with an acetylene partial pressure of 155 p.s.i.g. being maintained by addition of acetylene until no more is adsorbed, i.e. reacted.

The reaction mixture is cooled and 0.7 part of hydroquinone is added as an inhibitor against polymerization. The mixture is distilled, thereby removing the benzene solvent, at atmospheric pressure and the tri-n-butylvinyl tin is distilled at 88° under 0.9 mm. pressure. There is obtained 19.3 parts corresponding to a yield of 81%.

*Example 2*

To 12 parts of trimethyl tin hydride in 24 parts of xylene in a rocking reaction vessel are added 0.35 part of benzoyl peroxide. The reaction vessel is sealed and flushed with nitrogen three times, after which the rocker is started and acetylene gas is pressed into the vessel to a total pressure of 150 p.s.i.g. at ambient temperature. The reaction vessel is then heated to and maintained at 80° C. for 45 minutes with rocking. It is repressured with acetylene until no further pressure drop is observed.

The reaction vessel is then cooled and vented and the contents are added to a distillation vessel containing 0.01 part of hydroquinone and distilled. Trimethylvinyl tin is recovered in a yield of 80%.

*Example 3*

13 parts of tri-n-hexyl tin hydride, 26 parts of benzene and 0.4 part of azobisisobutyronitrile are added to a stainless steel reaction vessel which is then sealed and flushed with nitrogen. The reaction vessel is then pressured to 150 p.s.i.g. with acetylene and heated to 80° C. for 45 minutes. The vessel is cooled and vented and the clear, light, yellow material therein is distilled at atmospheric pressure in the presence of 0.02 part of hydroquinone to remove benzene, and then under reduced pressure to recover tri-n-hexylvinyl tin. The yield of the tri-n-hexylvinyl tin is 89%.

*Example 4*

12 parts of tri-isobutyltin hydride, 24 parts of benzene and 0.36 part of azobisisobutyronitrile are added to a stainless steel reaction vessel which is then sealed and flushed thrice with nitrogen. Acetylene is charged into the vessel to a pressure of 150 p.s.i.g. at room temperature. The vessel is then heated to 75° C. for 1 hour with rocking. The vessel is then cooled, vented and opened. The clear, light, yellow liquid therefrom is then distilled in the presence of 0.009 part of hydroquinone, first at atmospheric pressure, to remove the benzene, and then under reduced pressure to recover the tri-isobutyl vinyl tin. A yield of 85% is realized.

The reaction which occurs during the process of the present invention is believed to be as follows, although it could conceivably proceed by other mechanisms:

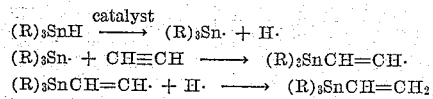

(R=an alkyl radical of 1–6 carbon atoms).

The catalysts which are utilized in the process of the present invention are not critical, however it is preferred that free-radical-generating catalysts be employed. In other words any of the commonly used free-radical-generating catalysts such as benzoyl peroxide may be used. Other catalysts include cumene hydroperoxide, azobisisobutyronitrile, salts of persulfuric acid (i.e., ammonium persulfate, potassium persulfate), salts of percarbonic acid (such as isopropyl percarbonate), salts of perphosphonic acid, salts or sulfo peracids, hydrogen peroxide, salts of perboric acid, performic acid, peracetic acid, and tertiary butyl hydroperoxide [$(CH_3)_3COOH$]. Of course, many other catalysts which may also be classified as free-radical-generating catalysts may be used. The catalysts preferred in the instant invention are benzoyl peroxide and azobisisobutyronitrile since these are the most readily available. It is also noted that the instant process can be carried out utilizing ionizing radiation as another free-radical-generating means.

The amount of catalyst employed in the invention is not critical, although generally about .05 to about 2%, preferably 0.1 to 1%, based upon the amount of hydride, is used. Less catalyst than this may be used without adversely effecting the reaction; more catalyst results in a greater amount of polymerization of the product.

The temperature of the reaction, i.e. the temperature to which the hydride and acetylene are heated, is generally in the range of from about 20° C. to about 150° C. and preferably from about 50° C. to about 90° C. Temperatures higher or lower than these are tolerable but do not fall into the optimum working conditions.

The acetylene partial pressure which is maintained in the process of the instant invention is critical and generally must be kept within the range of from about 15 p.s.i.g. to about 400 p.s.i.g. and preferably about 100 p.s.i.g. to about 200 p.s.i.g. Partial pressures of acetylene higher than approximately 400 p.s.i.g. are generally recognized as dangerous and therefore are not used. When pressures lower than 15 p.s.i.g. are used the reaction proceeds at a very slow rate.

The gas used to purge the reaction vessel can be added before or during the addition of the acetylene and is generally any inert gas such as nitrogen, carbon monoxide, helium, argon, propane, ethane and the like. When the purge gas is added in admixture with the acetylene, the total pressure of the gaseous mixture is not critical. The only prerequisite is that the acetylene partial pressure be maintained within the range set forth hereinabove. The acetylene is added in admixture with the purge gas mainly for safety reasons since the acetylene is relatively explosive. It should be noted that the use of a purge gas is not critical and other means of ridding the reaction vessel of oxygen can be used. For instance, the solvent can be boiled to form solvent vapor and this vapor thereby flushes the vessel or the same result can be achieved by purging repeatedly with low pressure acetylene.

The contact time of the reaction is not critical and generally good results can be obtained utilizing a contact time of from 10 minutes to 3 hours, preferably 30 to 60 minutes. As seen from the examples, the primary consideration is to continue the addition of acetylene gas until the reaction is complete, as evidenced by no further pressure drop. The acetylene addition influences the reaction in respect to contact time, that is to say, the more acetylene added to the reaction vessel, the shorter the reaction in respect to contact time.

The amount of trialkyl tin hydride utilized in the instant invention is not critical and is only governed by the capacity of the reaction vessel being employed and the amount of solvent added thereto, as mentioned hereinbelow.

The solvents which can be employed in the instant process can be classified as non-polar, inert solvents. Any non-polar inert material in which the trialkyl tin hydrides are soluble can be used. Examples of various solvents, although, not in the least, all inclusive, are benzene, toluene, xylene, hexane, heptane, and the like. The amount of solvent added to the tin hydride is generally such as to provide 20–50% concentration of tin hydride in the solvent by weight.

Although it is preferred to have a polymerization inhibitor present during the distillation of the solvent and trialkylvinyl tin in order to prevent the polymerization of the trialkylvinyl tin, the presence of such an inhibitor is not an essential aspect of the instant invention. However, when an inhibitor is employed, it is preferred that from about 0.05% to about 3% thereof, based on the amount of tin hydride, be present. Any known vinyl polymerization inhibitor may be employed, among the preferred being hydroquinone, tolylquinone, tert-butylcatechol, trinitrobenzene and the like.

As mentioned above, the starting materials are the trialkyl tin hydrides wherein the alkyl group contains 1 to 6 carbon atoms. The trialkyl tin hydrides have the formula

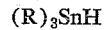

wherein R is an alkyl radical of 1 to 6 carbon atoms. Compounds which are included in this group are trimethyltin hydride, triethyltin hydride, tri-n-propyltin hydride, triisopropyl tin hydride, tri-n-butyl tin hydride, triisobutyltin hydride, tri-tert-butyl tin hydride, tri-n-pentyl tin hydride, tri-isopentyl tin hydride, tri-n-hexyl tin hydride and the like.

The process of the instant invention can be batch or continuous and after the solvent and trialkylvinyl tin have been removed, the remaining residual material is predominantly a polymerized trialkylvinyl tin product.

The trialkylvinyl tin which is prepared by the instant process provides a valuable monomer for copolymerization with other monomers such as acrylonitrile to produce materials suitable for fibers with improved dyeability and light fastness or it can be homopolymerized with free radical initiators to provide temperature-stable materials.

It will be appreciated that many modifications of the instant process may be made without departing from the scope of the instant invention as herein set forth. Accordingly, therefore, it is limited only by the following claims.

We claim:

1. A method for the preparation of a trialkylvinyl tin compound which comprises reacting acetylene with a trialkyl tin hydride of the formula:

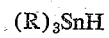

wherein R is an alkyl radical of 1 to 6 carbon atoms, at a temperature of from about 20° C. to about 150° C. in the presence of a free radical-generating catalyst and a solvent for the trialkyl tin hydride and under a partial pressure of acetylene of from about 15 p.s.i.g. to about 400 p.s.i.g., distilling off the solvent from the reaction products and recovering the trialkyl vinyl tin compound produced.

2. A method for the preparation of tri-n-butyl vinyl tin which comprises reacting acetylene with tri-n-butyl tin hydride at a temperature of from about 20° C. to about 150° C. in the presence of a free radical-generating catalyst and a solvent for the tri-n-butyl tin hydride and under a partial pressure of acetylene of from about 15 p.s.i.g. to about 400 p.s.i.g., distilling off the solvent from the reaction products and recovering the tri-n-butyl vinyl tin produced.

3. The method of claim 1 wherein the temperature is from about 50° C. to about 90° C. and the partial pressure of acetylene is from about 100 p.s.i.g. to about 200 p.s.i.g.

4. The method of claim 2 wherein the temperature is from about 50° C. to about 90° C. and the partial pressure of acetylene is from about 100 p.s.i.g. to about 200 p.s.i.g.

References Cited in the file of this patent

Van der Kerk et al.: February 1959, "J. Appl. Chem.," 9 pp. 106–113.

Seyferth: "J. Org. Chem.," 22, October 1957, pp. 1252–1253.

Chem. Rev. 60, No. 5, October 1960, pp. 476, 511, 512 and 530.